United States Patent

Detwiler

[15] 3,683,990

[45] Aug. 15, 1972

[54] NON-SKID TIRE STRUCTURE

[72] Inventor: John Detwiler, Manhasset, N.Y.

[73] Assignee: Chase Manhattan Capital Corporation, New York, N.Y.

[22] Filed: July 20, 1970

[21] Appl. No.: 56,475

Related U.S. Application Data

[63] Continuation-in-part of Ser. No. 847,965, Aug. 6, 1969, abandoned.

[52] U.S. Cl. .................................................. 152/225
[51] Int. Cl. ................................................. B60c 27/02
[58] Field of Search ...... 152/219, 225, 226, 227, 228, 152/229, 223

[56] References Cited

UNITED STATES PATENTS

| | | | |
|---|---|---|---|
| 1,533,679 | 4/1925 | Webster | 152/219 |
| 2,424,478 | 7/1947 | Mason | 152/225 |
| 2,728,371 | 12/1955 | McCarthy | 152/226 |

FOREIGN PATENTS OR APPLICATIONS

| | | | |
|---|---|---|---|
| 207,276 | 6/1959 | Germany | 152/225 |

*Primary Examiner*—James B. Marbert
*Attorney*—Kane, Dalsimer, Kane, Sullivan & Kurucz

[57] ABSTRACT

A non-skid tire structure including a tire having a pair of opposed side walls and a peripheral road contacting outer circumferential surface. The outer surface of the tire has a plurality of spaced grooves on its circumference. A deformable non-skid assembly is mounted on the tire. The assembly includes at least one anchor member on the tire and also includes a plurality of non-skid elements with each element having its ends connected to the at least one anchor member. A central portion of each of the elements is normally positioned in a corresponding groove on the circumference of the tire so that when the tire structure is rotating in normal engagement with a road surface, the elements will remain positioned in the grooves and when the tire structure skids on the road surface each element will contact the road surface and will frictionally engage therewith. The assembly will then automatically deform to permit the element to be at least partially displaced from the groove to increase frictional engagement between the road surface and the tire structure and to thereby assist in stopping the skid and returning the tire structure to normal engagement with the road surface. At that time, the assembly will automatically return to its normal configuration and position.

10 Claims, 30 Drawing Figures

PATENTED AUG 15 1972 3,683,990

INVENTOR.
JOHN H. DETWILER

BY

*Kane, Dalsimer, Kane, Sullivan, Kurucz*

ATTORNEYS

INVENTOR.
JOHN H. DETWILER

INVENTOR.
JOHN H. DETWILER
BY
ATTORNEYS

INVENTOR.
JOHN H. DETWILER

INVENTOR.
JOHN H. DETWILER

BY

ATTORNEYS

INVENTOR.
JOHN H. DETWILER

BY

ATTORNEYS

NON-SKID TIRE STRUCTURE

CROSS REFERENCE TO RELATED APPLICATION

This application is a continuation-in-part application of my previously filed application, Ser. No. 847,965 filed on Aug. 6th, 1969, now abandoned.

BACKGROUND OF THE INVENTION

The problem of alleviating the danger of skidding is well known to motor vehicle drivers and to airplane pilots. In fact, there are many known devices on the commercial market which are designed to assist in preventing skids.

Several of the more common types of devices used to increase traction of the wheels of a motor vehicle are chains, metallic studs mounted in the tire tread and an enlarged tread design which results in a tire commonly known as a snow tire. Each of the above mentioned non-skid devices have their advantages and also have their disadvantages.

For example, chains which may be normally removably engaged on the tire surface provide the greatest traction particularly on snow covered roads. However, their are many disadvantages inherent with the use of chains, particularly the fact that they are difficult to remove and apply to the tires while the tires are on the motor vehicle. Furthermore, when the motor vehicle has extracted itself from its non-traction position and is running in normal engagement with the road surface, the chains will cause noise, great discomfort to the rider in the motor vehicle, and damage to the road surface. This is due to the noise factor of the chains slapping against the road surface and the tire and the extremely bumpy ride encountered by one riding in a motor vehicle which has chains on its tires. Also, the chains have a tendency to wear and eventually to break. Noise, chain wear, and damage to the road surface are increased by the centrifugal force encountered during normal revolution of the tire and the loose relationship which the chains have with the tire surface. The result is often fracture of the individual links of the chain.

The permanent type of snow tire arrangements either in the form of tread design or by the presence of metal studs located in the tire treads provides a greater amount of comfort during normal travel of the tire on the road surface under normal traction. However, this type of tire does not provide as great an amount of traction for the tire when the motor vehicle is skidding on a slippery surface or a surface which contains a significant amount of snow. Furthermore, the presence of the studs and the presence of the enlarged tread design do also result in an increased amount of noise during normal operation of the motor vehicle over the normal and acceptable noise level present with a regular tire. Naturally, the noise is not as great as that encountered when chains are applied to the tire. However, it is a significant factor and adding to the discomfort of any passenger in the moving motor vehicle under normal road conditions.

With the above in mind, it would be advantageous in the art to provide a non-skid tire structure which combines all the advantages encountered in the above discussed non-skid tire structures while virtually eliminating all of the disadvantages encountered in each particular design discussed above. In short, it would be desirable to provide a non-skid tire structure having traction substantially equivalent to that provided by chains while having a noise level during normal running operations at least as satisfactory as that provided by normal snow tires and studs. Furthermore, it would naturally also be desirable to have a non-skid tire structure wherein the traction element may be either permanently applied to the tire or removably applied to the tire and which will automatically shift from a non-engaging or a minimum engaging position on the tire surface to a fully engaging position on the tire surface when skidding occurs to thereby assist in stopping the skid and returning the tire to normal engagement with the road surface. Finally, when the tire has been returned to normal non-skidding engagement with the road surface, the skid reduction portion of the tire structure will return to its normal original position thereby alleviating the noise factor of the tire under normal non-skid operating conditions and additionally alleviating the danger of fracture of any portion of the non-skid assembly employed as part of the tire structure.

SUMMARY OF THE INVENTION

It is among the primary objectives of this invention to provide a non-skid tire structure which incorporates the above mentioned advantageous features while eliminating the above discussed disadvantages of known non-skid tire structures. Furthermore, a non-skid tire structure is provided which automatically moves to a traction engaging position when the tire begins to skid and which automatically returns to its normal retracted position when the tire resumes the normal engagement with the road surface.

The non-skid tire structure of this invention includes a tire having a pair of opposed side walls and a peripheral road contacting outer circumferential surface. The outer surface of the tire has a plurality of spaced grooves on its circumference. A deformable non-skid assembly is mounted on the tire and the assembly includes at least one anchor member. The assembly also includes a plurality of non-skid elements with each element having its ends connected to the at least one anchor member. A central portion of each of the elements is normally positioned in a corresponding groove on the circumference of the tire so that when the tire structure is rotating in normal engagement with a road surface the elements will remain positioned in the grooves and when the tire structure skids on the road surface each element will contact the road surface and will frictionally engage therewith. At that time, the assembly will automatically deform to permit the element to be at least partially displaced from the groove to increase frictional engagement between the road surface and the tire structure and thereby assist in stopping the skid and returning the tire structure to normal engagement with the road surface. At that time, the assembly will automatically return to its normal configuration and position.

DESCRIPTION OF THE PREFERRED EMBODIMENTS

Figures 1A, 1B:
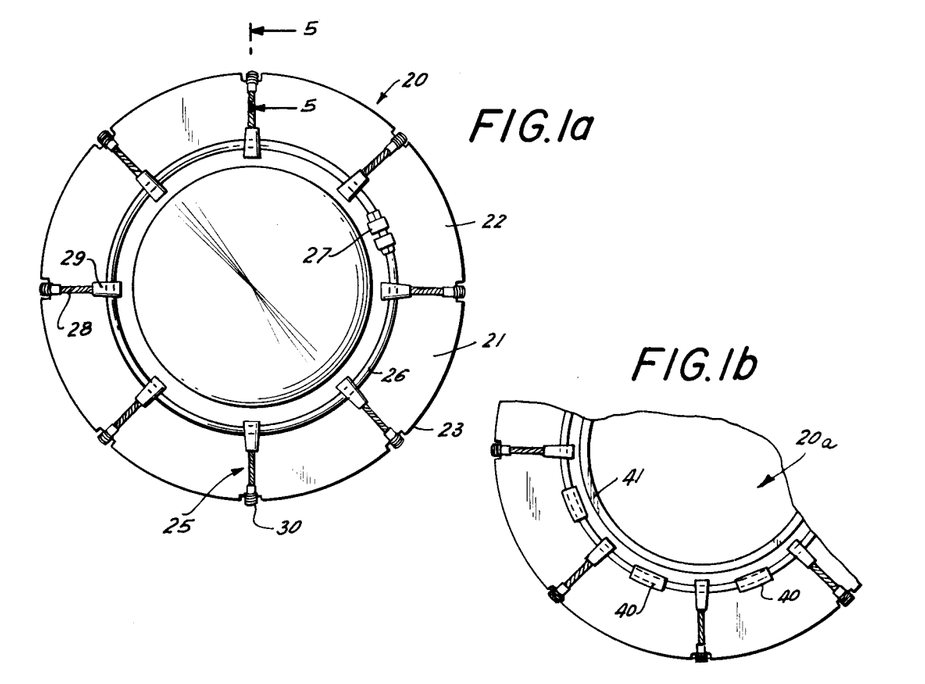
FIG. 1a is a side elevation view of a non-skid tire structure of the invention.
FIG. 1b is a fragmentary side elevation view of an alternative embodiment of a non-skid tire structure of the invention.

The non-skid tire structure 20 of the invention is depicted in one embodiment in FIG. 1a in assembled form. The structure includes a tire 21 which is a common type of tire utilized on a motor vehicle. The tire has two side walls 22 and an outer peripheral circumferential surface 23. A plurality of transverse grooves 24 are located in the outer peripheral portion of the tire 21. Grooves 24 as shown may be substantially perpendicular to the circumference of the tire or if desired they may be positioned at an angle to the circumference of the tire. As shown, grooves 24 may be spaced equidistance around the circumference of tire 21 or naturally alternatively they may be spaced at irregular intervals. These factors are a matter of choice for the manufacturer. A deformable non-skid assembly 25 is mounted on the tire. Assembly 25 includes a pair of anchor members 26 one of which is positioned on each side of the tire against a respective side wall 22. If desired, it is possible to mount assembly 25 by means of one anchor member 26. As shown, the anchor members 26 are circular in configuration and form a continuous member. A common type of fastening means 27 is utilized to disengage continuous anchor member 26 to facilitate removal of assembly 25 from tire 21. Each anchor member 26 my have a fastening means 27. Also, each anchor member 26 is shown as a length of cable, for example, steel cable. Naturally, the anchor member may be constructed of many other similar materials of substantially the same strength such as a metal chain.

Assembly 25 also includes a plurality of transverse elements 28 of a strong material such as steel cable as shown or a similar material. Each element 28 is of a common size and length and has one end fastened to one anchor member 26 by a common type of fastening means 29 and the other end connected to the other anchor member 26 by a similar type of fastening means 29. If only one anchor member is utilized, one end of each element 28 would be fastened directly to the tire. It will be noted that the transverse elements 28 are positioned so that most of the central portion 30 thereof is normally located in a groove 24 of tire 21. Central portion 30 may be a selected part of each element 28 of any desired length and at any location between the distal ends of the element. The number of elements 28 correspond to the number of grooves 24.

Figure 2:
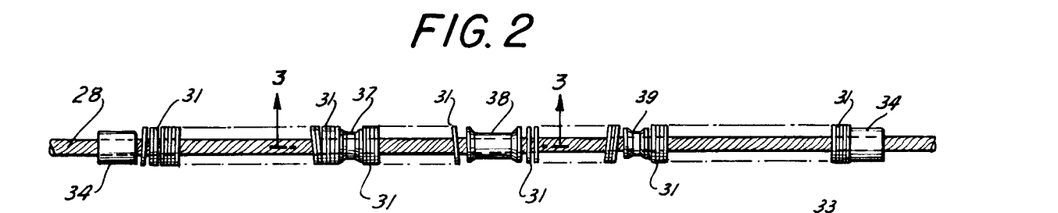
FIG. 2 is a fragmentary plan view of a transverse element portion of non-skid tire structure according to the invention.

Mounted on the central portion 30 of each element 28 are a multiplicity of discs 31. Each disc 31 has a centrally located bore 32 which has a slightly larger diameter than the outer diameter of element 28. This permits each disc 31 to rotate freely about element 28 when it is positioned thereon. Each disc 31 also contains a number of circumferential notches which results in the outer portion of each disc having a plurality of teeth 33 which thereby increases the gripping surface of each individual disc 31. In viewing FIG. 2, it will also be noted that there is lateral play between individual discs 31 to allow a certain amount of movement of the discs along element 28. Discs 31 are restricted in their movement by a pair of fixed end stops 34 mounted on the central portion of each element 28 in tight frictional engagement so that discs 31 are maintained in a relatively confined area on the central portion 30 of each element 28.

Discs 31 are also to be constructed of a hard wear resistant material such as a carbide hardened steel. As previously stated, each disc 31 has a multiplicity of teeth 33 on its outer surface to facilitate the gripping surface of the disc. Alternatively, the discs 31 may have a solid outer configuration which will also work satisfactorily. The general configuration of discs 31 may be best seen in FIGS. 3 and 4 of the drawings. It will be noted from FIG. 4 that the discs 31 have a curved configuration so that one side has a convex surface 35 and the other side has a concave surface 36.

Also positioned between end stops 34 along with discs 31 may be a number of anti-skew members or separators 37, 38 and 39. Although three such separators are shown in the drawings, the number of such separators is merely a matter of choice. As shown, the anti-skew member or separator 38 is longer than the other two separators 37 and 39 in respect to the length of element 28 and is generally positioned above a plug in the tire groove 24 so that it projects above the peripheral portion of the tire and comes into contact with the road or runway surface once during each rotation of the tire. It may be of a different, more wear-resistant material than the other anti-skew members or separators 37 and 39.

Each anti-skew member has a central bore through its center of a diameter which is slightly larger than the diameter of element 28 so that each of the separators 37, 38 and 39 are free to revolve about member 28 and slide along its length. Naturally, the distance to which the separators may slide is dependent upon the distance between end stops 34 and the number of discs 31 also positioned between end stops 34. The anti-skew members or separators 37, 38 and 39 have a general cylindrical configuration and may have any other similar configuration which will facilitate the rotation of the anti-skew member about the member 28 when it is in contact with the road surface.

Separators 37, 38 and 39 are present on central portion 30 of member 28 to prevent the individual discs from being forced too far from the perpendicular with respect to member 28 and thereby alleviate the danger of the inner surface of each individual disc from cutting member 28 or otherwise damaging it. By increasing the clearance between the individual discs and the cable or by decreasing the thickness of the individual discs, or both, the need for the anti-skew members or separators may be reduced or eliminated. Thus, if desired, each transverse element may be constructed with discs and end stops thereon so as to function with or without the presence of anti-skew members or separators Additionally, the individual discs may have irregular faces which would be used to prevent them from revolving with respect to one another when it is desirable to do so in order to obtain better function with respect to the non-skid operation of the assembly 25.

It should also be noted that since anti-skew member 38 is positioned at approximately the center of transverse element 28, all of the discs have their convex surface 35 facing separator 38. Therefore, all of the discs to one side of separator 38 have their convex surface 35 facing in one direction and all of the discs to the other side of centrally located separator 38 have their convex surface 35 facing in the opposing direction. This feature is advantageous in causing the portion of each disc which is in contact with the road to be approximately perpendicular to the road when the forces acting on the disc cause the main face of the disc to be at a slight angle with respect to the road.

Figure 3:
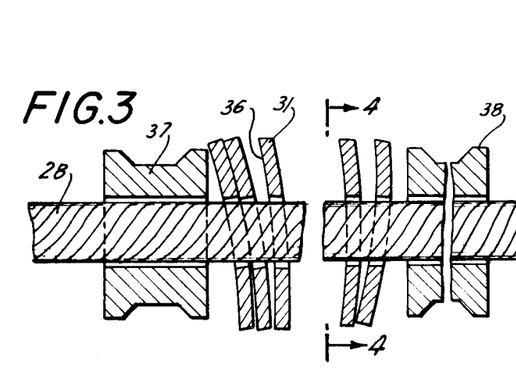
FIG. 3 is a fragmentary sectional plan view thereof taken along the plane of line 3—3 of FIG. 2.
Figure 4:
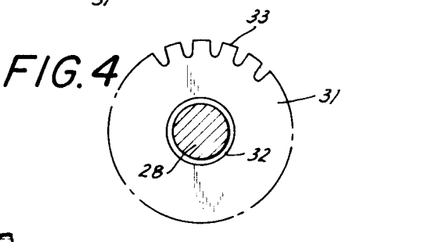
FIG. 4 is a sectional end elevation view thereof taken along the plane of line 4—4 of FIG. 3.

The manner in which the separators facilitate the retention of the discs 31 in a more upright position so as to prevent cutting of member 28 by the inner edge of the disc 31 is represented in FIG. 3. It will be noted in that FIG. that the upper edge of disc 31 will contact the anti-skew member before the central edge of the disc has an opportunity to cut or damage member 28.

Additional features may be presented on the nonskid tire structure 20 as represented by embodiment 20a depicted in FIG. 1b. In that embodiment as shown, a plurality of counterweights 40 are mounted on each anchor member 26 in spaced relationship and are located so that a counterweight 40 is positioned between each pair of transverse members 28. With this arrangement, when the tire 21 is rotating in normal engagement with the road surface in a non-skidding relationship, the centrifugal force which tends to throw members 28 out of grooves 24 will be counteracted by the centrifugal force acting on weights 40 so that members 28 will remain in relatively fixed position within grooves 24. This alleviates the problem of excessive noise caused by any whipping of members 28 caused by centrifugal force during rotation and retains assembly 25 in relatively fixed operating position.

An additional feature which may be utilized as shown in embodiment 20a is the provision of an annular projection or rim 41 extending from the side walls of tire 21. Two similar projections 41 are provided, one positioned on each of the side walls of the tire at relatively the same radial distance from the center of the tire and as shown positioned just below assembly 25. The presence of projections 41 prevents the excessive displacement assembly 25 in a sliding radial direction. Assembly 25 may only slide a small amount when it will come in contact with one of the two projections 41 and it will be stopped at that point where it will remain until forces tend to slide it in the opposing direction. Naturally, the limit in the opposite direction will be controlled by the position of the other projection 41. Once again, this feature provides a means for retaining assembly 25 in a relatively fixed location with respect to tire 21 and prevents the danger of excessive slippage which could cause damage to assembly 25 or detract from the operative non-skid features of assembly 25.

Figure 5:
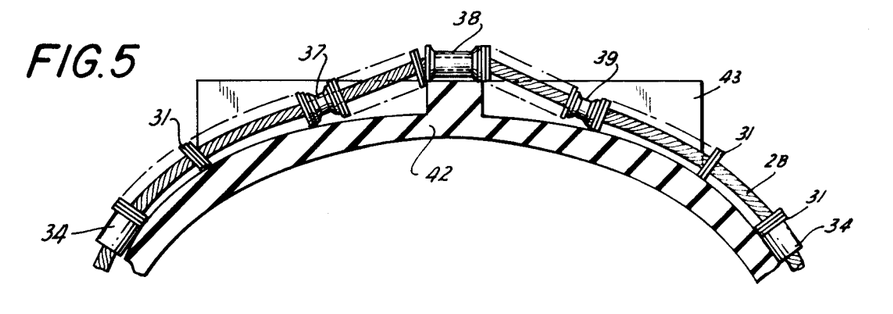
FIG. 5 is a fragmentary sectional end view of the non-skid tire structure according to the invention showing a transverse element in normal retracted position within its respective groove.
Figure 6:
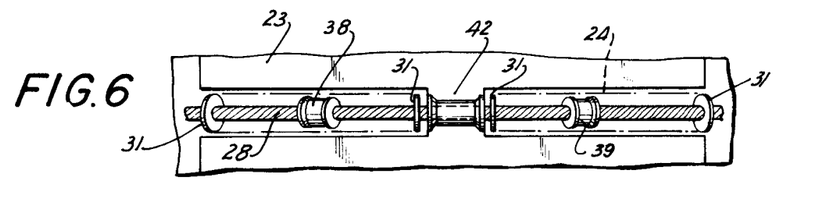
FIG. 6 is a fragmentary top plan view thereof.
Figure 7:
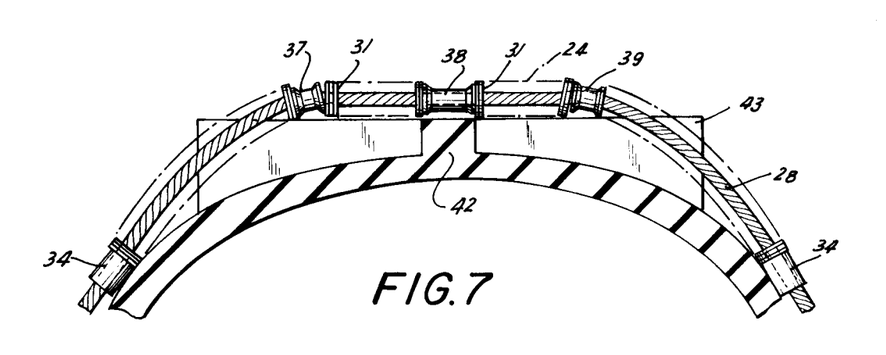
FIG. 7 is a fragmentary sectional end elevation view thereof showing the transverse element while the tire is skidding and the transverse element has been removed to its engaging position to assist in stopping the tire skid.
Figure 8:
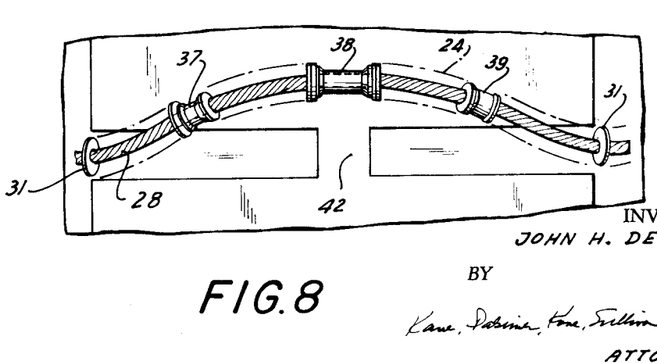
FIG. 8 is a top plan view thereof with the transverse element shown in its non-skid position.

FIGS. 5 through 8 represent the operative positions of non-skid tire structure 20 with FIGS. 5 and 6 representing the normal non-skid position and FIGS. 7 and 8 representing the position of the transverse element when the tire is skidding with respect to the road surface. In the embodiment shown in FIGS. 5 and 6, a central plug 42 divides groove 24 into two separated elements. The top edge of plug 42 is substantially level with the outer peripheral surface 23 of tire 21. In this embodiment, central separator 38 mounted on element 28 is positioned above groove 24 and rests on the top surface of plug 42. In this position, separator 38 and immediately adjacent discs 31 are in contact with the road surface when that particular portion of tire 21 is in engagement with the road thereby assuring that a portion of element 28 is always in contact with the road surface should a skid begin. It is therefore imperative that separator 38 be constructed of an extremely hard wear reSistant material such as a carbide. Separator 38 may be of different shape, dimensions, and material the other anti-skew members or separators if other separators are used.

When a skid is initiated, the frictional engagement between the road surface and separator 38 and adjoining disc 31 will draw element 28 substantially out of groove 24 and onto the peripheral outer surface 23 of tire 21. In this position, a large portion of central portion 30 is resting on the outer peripheral surface of tire 21 and forms a large gripping surface to facilitate re-engagement between the tire structure 20 and the road surface. The dimensions of deformable non-skid assembly 25 are such that it may be deformed a sufficient amount of permit element 28 to be displaced from groove 24 to the extent shown, for example, in FIGS. 7 and 8. If the skid continues, the particular element 28 removed from its particular groove 24 will pass from contact with the road surface and will be withdrawn back to its normal position within groove 24 sand the next element 28 in sequence will come in contact with the road surface and assume its non-skid position as shown in FIGS. 7 and 8. The deformability of assembly 25 will be just enough to permit one member 28 to be removed from its respective groove 24 at any one time.

When the tire is in normal engagement with the road surface and all of elements 28 are positioned in their normal position within grooves 24, very little noise and vibration are present since the majority of each element 28 is located within a groove 24 in the tire and there is very little slack so that there is consequently very little movement between non-skid assembly 25 and tire 21. When an element 28 is in its non-skid position and the majority of the central portion 30 of element 28 is located on the peripheral outer surface 23 of tire 21, the discs 31 and separators 37, 38 and 39 provide a large frictional surface to facilitate engagement between the tire structure 20 and the road surface and stop the skidding action. In fact, approximately 30 times as much frontal surface area projects from tire 21 during skidding on soft surfaces such as snow that the frontal area of the studs which would project from a studded type of snow tire.

It should also be noted that in the embodiment disclosed in FIGS. 5–8 the outer portions of grooves 24 have relatively high side walls 43 so that the outer portions of central portion 30 of each member 28 is retained within groove 24 even during the non-skid position of the element. This facilitates the return of the element 28 to the groove after the skid has been stopped or the particular element 28 has passed from contact with the road surface. There are many alternative means for retaining the end portions of central portion 30 within grooves 24 during the non-skid or traction position. A number of these are illustrated in FIGS. 9–14. Another alternative embodiment which should be kept in mind is that if additional area of element 28 is desired on the peripheral surface of tire 21, the depth of the grooves can be made shallower so as to provide lower side walls and permit removal of the entire central portion 30 of element 28 from the groove 24. In such an arrangement, retaining rings or similar devices may be anchored in the side walls of the tire at the location of the respective grooves to assure that element 28 will be properly returned to its normal position when the tire structure 20 is once again in normal engagement with the road surface.

In still another alternate embodiment, one end of the central portion 30 may be fastened to an anchor member and the other end may be fastened directly to the tire.

Figure 9:
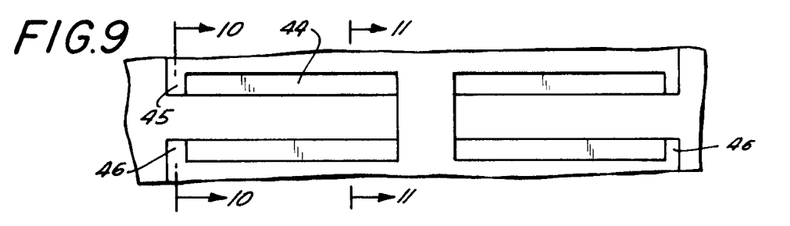
FIG. 9 is a fragmentary top plan view of an alternative groove structure for use with the non-skid tire structure of the invention.
Figure 10:
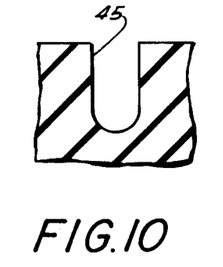
FIG. 10 is a fragmentary sectional end elevation view thereof taken along the plane of line 10—10 of FIG. 9.
Figure 11:
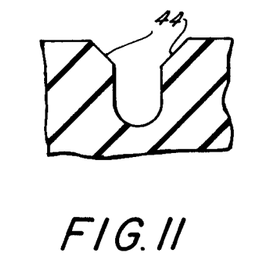
FIG. 11 is a fragmentary sectional end elevation view thereof taken along the plane of line 11—11 of FIG. 9.

Turning to consideration of the embodiment shown FIGS. 9–14, it will be noted that the embodiment of FIGS. 9–11 provides a different groove structure to facilitate the transfer of element 28 from the groove onto the peripheral surface of the tire in operative position while retaining the end portions of central part 30 within groove 24 to facilitate return of element 28 into its normal inoperative position. As depicted, the major portion of groove 24 is beveled on the upper part of its side walls to facilitate quick and efficient removal of element 28 from the groove and return thereto. This beveled upper part 44 extends almost the entire width of central portion 30 of element 28 with the exception of a small part at the outer extremities of the groove. This part has vertical side walls from the bottom to the top of the groove thereby tending to catch and retain the outer parts of central portion 30 within the groove when the element 28 is in the operative position. The part of groove 24 having the beveled upper side walls is best depicted in FIG. 11 while the part of groove 24 having the entirely vertical side walls 45 is best depicted in FIG. 10.

Figure 12:
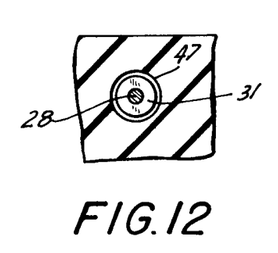
FIG. 12 is a fragmentary sectional end elevation view of an alternative embodiment of the portion of a transverse groove of the portion designated by the plane of line 10—10 of FIG. 9.
Figure 13:
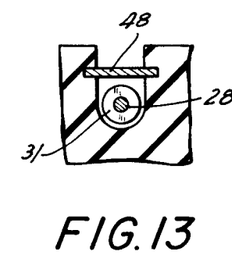
FIG. 13 is a further alternative embodiment of the same portion of the transverse groove as depicted in FIG. 12.
Figure 14:
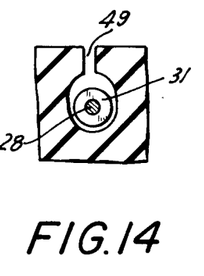
FIG. 14 is a still further alternative embodiment of the portion of the transverse groove as depicted in FIG. 12.

This small outer portion 46 of groove 24 may assume a variety of configurations to retain a part of element 28 within groove 24 even when the central portion 30 of element 28 is in the operative position on the peripheral outer surface 23 of tire 21. Several of the alternative configurations of outer portions 46 are displayed in FIGS. 12–14. In FIG. 12, for example, outer portions 46 of groove 24 are virtually solid with the exception of a bore 47 in alignment with the base of groove 24 to receive member 28 therethrough. Bore 47 is of sufficient size to permit easy passage of member 28 therethrough. Alternatively, as shown in FIG. 13, a metal clip 48 may be employed over the end portions 46 of groove 24 in order to retain a portion of member 28 within groove 24 at all times. Similarly, turning to FIG. 14, it will be noted that portion 46 may be provided with only a narrow opening 49 in its upper surface so that member 28 may not be vertically displaced from groove 24 at that location. Once again, in this manner a portion of member 28 will be retained within groove 24 at all times, that is, both when member 28 is in its normal inoperative position within slot 24 and when member 28 is in its operative position on the outer peripheral surface of tire 21.

Another means which should be considered in order to assure that a portion of member 28 is retained within groove 24 at all times is one where the tread of tire 21 is widened at the portion thereof where each groove is located and the area adjacent thereto. By widening the tire tread at this point the length of groove 24 is extended which decreases the chances of removing entirely element 28 from groove 24. This is due primarily to the fact that the length of the groove is extended and assembly 25 may only be deformed a certain amount to permit movement of any individual element 28 so that element 28 may not be provided with enough slack to come entirely out of groove 24.

It is also naturally desirable to provide the non-skid tire structure with enough of each respective element 28 exposed so that frictional engagement between the exposed portion thereof and the road during a skid will be sufficient to remove element 28 from groove 24 into its operative position on the peripheral surface of the tire. All of the previously discussed embodiments are directed toward a groove which had one central plug on which a small portion of element 28 rests during the non-operative period for the element. Naturally, the groove could also be constructed with more than one plug so that each element 28 is exposed at more than one point which would increase the area coming in contact with the road surface at any given time and increase the frictional force between each element 28 and the road surface to provide a greater force for shifting the element 28 from the groove 24 to the outer surface 23 of tire 21.

Figure 15:
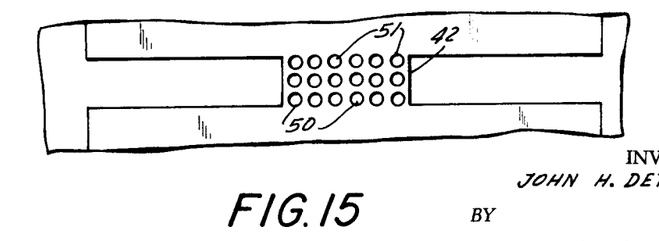
FIG. 15 is a fragmentary top plan view of another alternative embodiment of the transverse groove portion of the non-skid tire structure of the invention.

Since a portion of element 28 is constantly coming in contact with the road surface on each revolution of tire 21, it would be desirable to reduce the wear on this portion of each element 28 during the longevity of the tire itself. The embodiment depicted in FIG. 15 illustrates how this may be more effectively accomplished. Since the exposed portion of element 28 in the normal retracted position when the tire is not skidding is normally positioned on one or more plugs 42, the more resilient plug 42 is made the greater the tendency for the exposed portion of element 28 to sink down within groove 24 by compressing plug 42 when the particular element 28 is in contact with the road surface As shown in FIG. 15, the resilience of plug 42 may be increased by perforating the plug. The perforation 50 extends radially with respect to the plug and the tire and, by decreasing the rigidity of plug 42, decreases the pressure required to press element 28 into the tire. This in turn reduces the wear on element 28 and the wear on the road during normal operation. Naturally in addition to perforations, slits, grooves or cut-aways may be made in plug 42 to accomplish the same results. Similarly, holes, slits, grooves or cut-aways may be provided in the portion of the outer peripheral surface 23 of tire 21 where element 28 would normally rest when the tire is skidding with respect to the road surface. This particular feature is not shown in the drawings, however it can be readily envisioned since the perforations would appear on the peripheral surface of the tire and would be similar to perforations 50 in FIG. 15. These perforations in the peripheral surface of tire 21 increase the ease with which the transverse element may be pressed into the tire, thereby reducing wear on the transverse element when skidding occurs, particularly on bare pavement.

Figure 16:
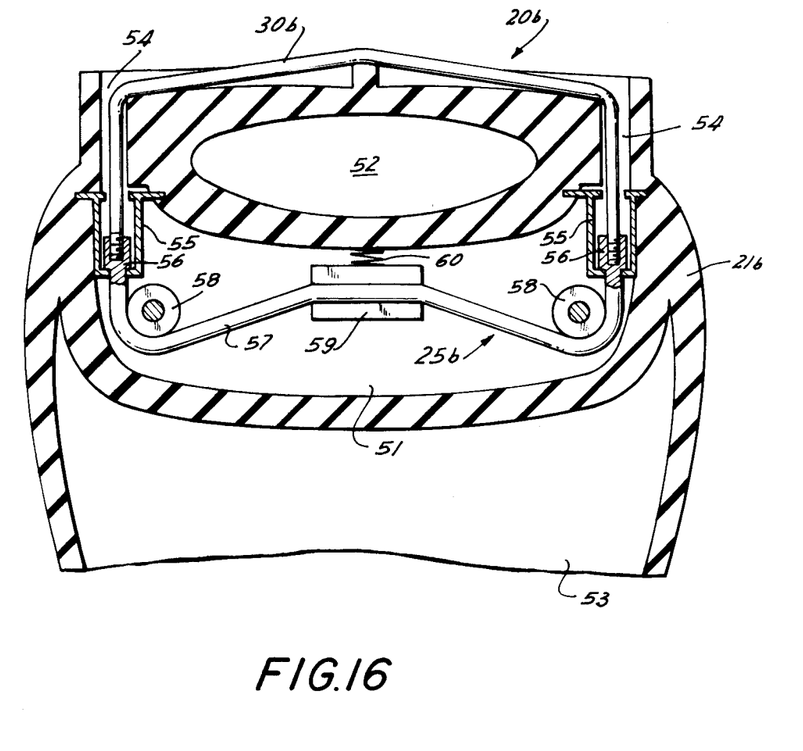
FIG. 16 is a fragmentary sectional elevation view of an alternative embodiment for positioning the non-skid assembly in connection with the tire portion of the non-skid tire structure of the invention.

Another alternative embodiment is depicted in FIG. 16. This embodiment is utilized to increase the aesthetic value of the non-skid tire structure 20b. This would be particularly useful when beauty of the motor vehicle is important such as in high priced pleasure vehicles. In the embodiment of FIG. 16, non-skid tire structure 20b has its entire non-skid assembly 25b housed within a cavity in the tire 21b with the exception of the central portion 30b of each element 28b. The central portion of element 28b is naturally in accordance with the invention and naturally rests within a respective groove 24b in the outer surface of tire 21b. When the tire begins to skid, element 28b shifts from the normal non-operative position within slot 24b to the operative position on the peripheral surface 23b of tire 21b. Naturally, the shifting between these respective positions is automatically accomplished depending upon whether the tire is skidding with respect to the road surface or not as discussed in reference to the above discussed embodiments.

The anchor portions of non-skid assembly 29b of the embodiment of FIG. 16 which are housed within tire 21b are somewhat different in structure than the anchor are mounted on the exterior surface of the peripheral walls of the tire. In this embodiment, the anchor members are located and mounted on the interior surface of the respective side walls of the tire 21b.

As shown in the drawings, the chamber 51 in which the anchor portion of non-skid assembly 25b is mounted is located between two inflated portions 52 and 53 of the tire 21b. Chamber 51 is open to the atmosphere through channels 54 and similarly through channels 54 communicates with each respective slot or groove 24 in which each respective element 28 is normally positioned.

The anchor portion consists of a pair of brackets 55 mounted to the interior peripheral side walls of the tire. Each bracket 55 has mounted therein a threaded metal insert 56 to receive each respective end of each element 28. There are a pair of brackets 55 for each individual element 28. The metal inserts 56 are connected to a continuous flexible member 57. Member 57 extends between each pair of brackets 55 and bears on a pair of cylinders 58 mounted in parallel relationship within cavity 51 in the tire 21b. Centrally located within cavity 51 is a counterweight 59 which is held to the interior surface of tire 21b by means of light spring 60. Spring 60 holds weight 59 in vertical position with respect to the tire 21b. Flexible member 57 extends through an opening in weight 59 and is thereby mounted therein. Weight 59 forms the counterweight for the centrifugal force acting on each member 28 as tire 21b rotates during normal operation of the motor vehicle. As explained above, each counterweight 59 acts centrifugally to retain each member 28 within each groove 24 during normal operation of the tire on the road surface by countering the centrifugal force tending to expel member 28 from groove 24 during rotation. It should be noted that chamber 51 is open to the atmosphere through channel 54 and therefore need not be kept at any particular pressure or inflated in any manner. Furthermore, it should be noted that the entire anchoring assembly for the non-skid tire structure of the embodiment of FIG. 16 is housed within the tire so that aesthetically no portion of the non-skid structure is visible while viewing the outer surface of the side walls of the tire 21b. This naturally increases the aesthetic value of the non-skid tire structure and renders it particularly effective for use in pleasure vehicles. The anchoring structure depicted in FIG. 16 is merely representative of a variety of similar anchoring means which may be utilized to effectively anchor member 28 within groove 24 during normal operation of the motor vehicle or airplane and yet permit the deformation of the assembly so that the central portion 30b of each member 28 may be transferred to the outer peripheral surface 23b of tire 21b during skidding of the tire with respect to a road surface. Naturally the transference of each member 28 between its two respective positions is done automatically depending upon whether the tire is in normal engagement with the road surface or in skidding relationship therewith. This action is identical with the embodiments discussed in detail above.

Figure 17:
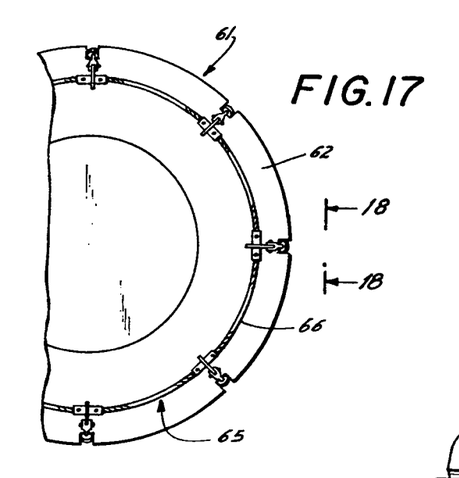
FIG. 17 is a fragmentary side elevation view of another alternative embodiment of a non-skid tire structure of the invention.
Figure 18:
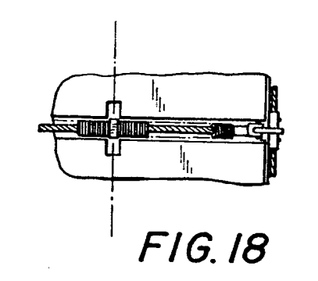
FIG. 18 is a fragmentary and plan view thereof taken along the plane of line 18—18 of FIG. 17.
Figure 19:
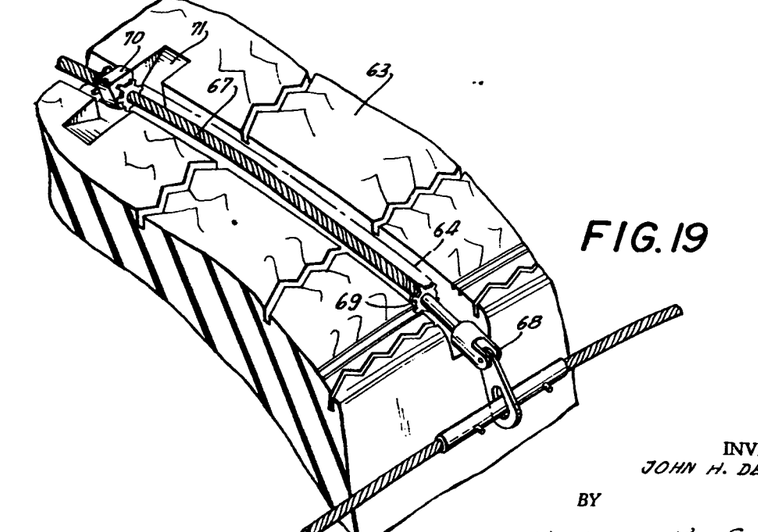
FIG. 19 is a fragmentary enlarged perspective view thereof.
Figure 20:
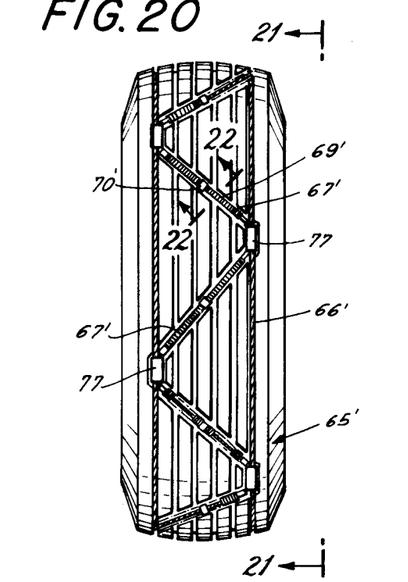
FIG. 20 is an end elevation view of a still further alternative embodiment of a non-skid tire structure of the invention.
Figure 21:
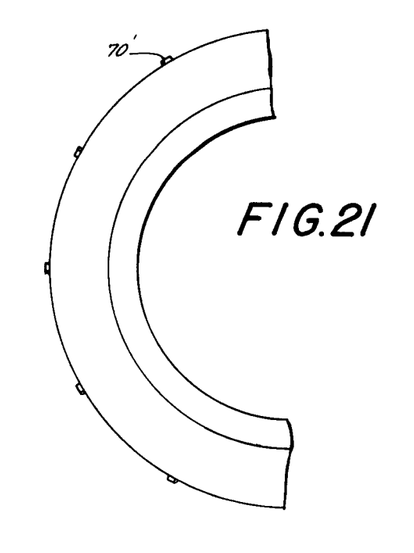
FIG. 21 is a fragmentary side elevation view thereof taken along the plane of line 21—21 of FIG. 20.

FIGS. 17–19 show a further embodiment of the invention. The non-skid tire assembly 61 of this embodiment includes a tire similar to that of the previous embodiment including a pair of side walls 62 and a circumferential road engaging surface 63. Road engaging surface 63 includes a plurality of spaced grooves 64 on the circumference of the tire. A non-skid assembly 65 is either permanently mounted on the tire or is mounted similar to the manner in which previously discussed embodiments are mounted.

Assembly 65 includes a pair of circular cables 66 which form anchor members and are mounted on opposed sides of tire 62. It should be noted that cables 66 are of a diameter somewhat less than the outer diameter of the tire yet they are located adjacent to tread area the tire.

A plurality of transverse element 67 are positioned respectively in each circumferential groove 64 in the tread of the tire. Each element 67 is connected at one of its ends to one of the anchor members 66 and at the other end to the other of the anchor members 66. The connection is made by means of a connector assembly 68 which includes two pivotally connected members which due to the freedom of movement between these members facilitates movement of element 67 with respect to the remainder of assembly 65 and tire 62. In this manner, the wearing of the cable portion of element 67 which would normally occur were the cable bent along its length at the point where the tread portion meets the side wall of the tire is alleviated.

As discussed in connection with previous embodiments, the entire assembly 65 is deformable to a position which will permit at least a portion of one element 67 to be displaced from groove 64 onto the surface of the tire to accomplish the non-skid function.

Additionally, similar to previous embodiments, each element 67 contains mounted thereon a number of spiked discs 69 in spaced relationship on the cable portion of element 67. Discs 69 normally reside in groove 64 until element 67 is partially displaced onto the tire surface for non-skid action. Although only several of the spiked discs are shown in FIG. 19 of the drawings, a plurality of such discs are position on the length of cable of element 67 in the manner discussed in connection with the previous embodiments.

An additional member which may be identified as a non-skid assembly activation piece 70 is also mounted on each element 67 intermediate the ends thereof. Activation piece 70 has an opening therethrough through which the cable portion of element 67 passes in a manner which will permit piece 70 to rotate about the cable portion of element 67. A notch 71 is provided in the tire tread circumferential surface at the location of piece 70. Notch 71 is substantially perpendicular to groove 64 and has an inclined surface in both directions from notch 64 to facilitate the movement of activation piece 70 both out of groove 64 onto the tire surface to stop the skid and then back down into groove 64 when normal road contact is achieved between the tire on the road surface. Since notch 71 extends in both directions from groove 64, it is readily apparent that element 67 may be displaced in either direction with respect to groove 64.

Activation piece 70 has a bell-shaped cross-sectional configuration which includes a flat bottom surface 72 which is substantially rectangular extending into two opposed tapering side walls 73 which terminate and interengage with an arcuate and semi-cylindrical upper portion 74.

Figure 22:
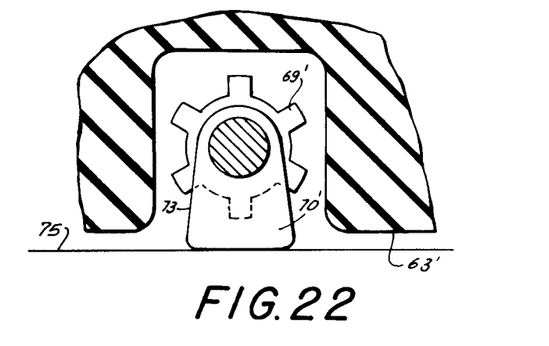
FIG. 22 is an enlarged fragmentary sectional view thereof showing the position of a non-skid element with respect to the tire in the normal non-skidding position.

As shown in FIG. 22 in connection with the embodiment of FIGS. 20–24 which contains similar transverse elements to the embodiment of FIGS. 12–19, during normal operation of the motor vehicle, the outer tire surface 63' comes into normal gripping engagement with the road surface 75. During this normal operation, no portion of the non-skid assembly 65' contacts the road other than the bottom rectangular surface 72' of piece 70'. The remainder of transverse elements 67' are contained entirely within the groove 64'.

During normal driving, contact or activation piece 70' is designed to contact the road surface and assist in retaining the transverse frictional element 67' in groove 64'. The heavy end of the bell-shaped piece 70' which includes flat rectangular lower surface 72' will centrifugally be thrown outward during normal driving. This portion 72' contacts the ground surface and assist in pressing element 67' into groove 64'.

Figure 23:
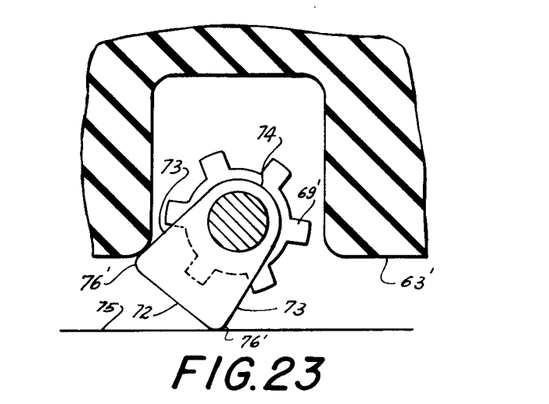
FIG. 23 is a fragmentary sectional view thereof showing a non-skid element changing position with respect to the tire as the tire begins to skid with respect to the road.
Figure 24:
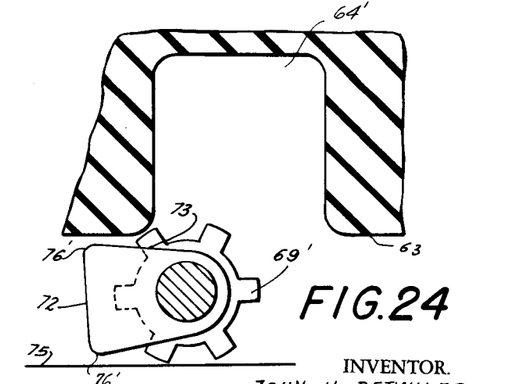
FIG. 24 is a fragmentary sectional view thereof showing the non-skid element in the full road engaging position with respect to the road and the tire to facilitate stopping of the skid.

When the tire begins to skid, as shown in FIG. 23, the bell-shaped piece 70' is caused to rotate by frictional forces between its lower surfaces and ground surface 75. In rotation, the corners 76' of piece 70' contact and frictionally engage with the road surface 75 and the outer surface 63' of the tire so as to act as a lever and to eject the remainder of element 67' from groove 64'. In this manner, an additional portion of transverse element 67' is transferred up onto the outer circumferential tire surface and discs 69' will then grip the road surface adding to tire traction as shown in FIG. 24. In all other respects, non-skid assembly 65 acts in a similar manner as that discussed in respect to previous embodiments of the invention. This is primarily in regard to deformation of the assembly and return of each respective transverse element 67' into its corresponding groove 64' after it has passed the road engaging position.

Although there is only one element 70 and, where desired, one notch 71 shown in FIGS. of the drawings, it is readily apparent that any desired number of such element 70 and, if desired, corresponding notches 71 may be employed for each individual element 67 of any assembly 65. It should also be kept in mind that a notch 71 is not necessarily required for each piece 70. Notch 71 merely facilitates the movement of piece 70 with respect to the tire surface and, if it is desirable, piece 70 will operate in the same manner as described above satisfactorily without the presence of a notch 71. With this in mind, it should be pointed out that the details of movement of piece 70' as shown in FIGS. 20–24 show a tire structure without the presence of a notch.

In that embodiment, it should be noted that anchor members 66' are positioned in circumferential tire tread grooves or recessions on the outer circumferential surface of the tire rather than adjacent the side walls of the tire as in previously discussed embodiments. They are recessed in corresponding grooves a sufficient amount below the contact surface within the conventional pattern of tire tread design so as to not interfere with the operation of the tire or transverse elements 67' operating in their non-skid functions. Assembly 65' may be assembled on the outer surface of the tire in a similar manner to that of the previous embodiments with appropriate connectors, if desired, along the length of each anchor member 66'.

It should also be noted in this embodiment that the transverse elements 67' and corresponding grooves are diagonal with respect to the parallel anchor members 66' and the perimeter of tire. As shown, the grooves and elements diagonally cross the tire and zig zag back and forth in a continuous transverse pattern. This is one of many different types of groove and element patterns which may be employed with the non-skid assembly of this invention along with those described above and below. Element 67' of the embodiment of FIGS. 20–24 includes a plurality of notched discs 69' and an activation piece 70' of bell-shaped configuration as described above.

Appropriate side fittings 77 are employed to facilitate connection of the transverse element 67' to the anchor members 66'. It is preferred in this embodiment that the anchor members be circular and continuous.

FIGS. 25–29 schematically show additional embodiments for the non-skid assembly which operate in a similar fashion to the embodiments discussed above but merely employ a different configuration of transverse elements and positioning of anchor members than in the above embodiments.

Figure 25:
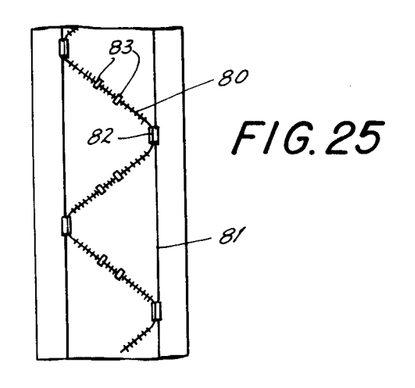
FIGS. 25–29 respectively are fragmentary end elevation views of additional embodiments of non-skid tire structures of the invention.

FIG. 25 is a schematic view showing diagonal transverse elements 80 and circumferential anchor members both positioned in grooves in the outer surface of the tire. Appropriate side fittings 82 are employed to connect elements 80 to anchor member 81. In this embodiment two bell-shaped activation pieces 83 are employed for each transverse element to facilitate its movement between the normal position and the non-skid position on the tire surface.

Figure 26:
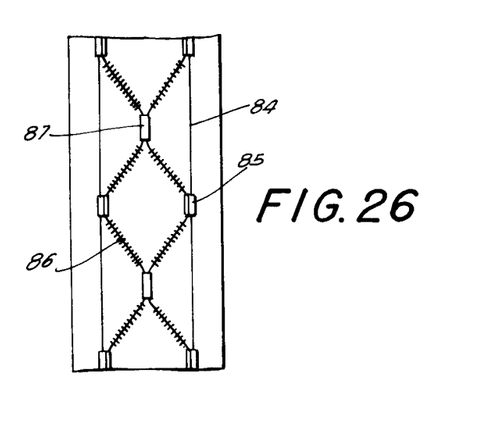

The embodiment of FIG. 26 employs anchor members 84 located in circumferential grooves on the outer peripheral surface of the tire. Appropriate fittings 85 are provided for connection of anchor members 84 to the individual transverse elements 86 which are arranged so as to form a diamond-shaped configuration of the outer surface of the tire. Appropriate fittings 87 are employed to facilitate formation of the diamond configuration for the transverse member 86.

Figure 27:
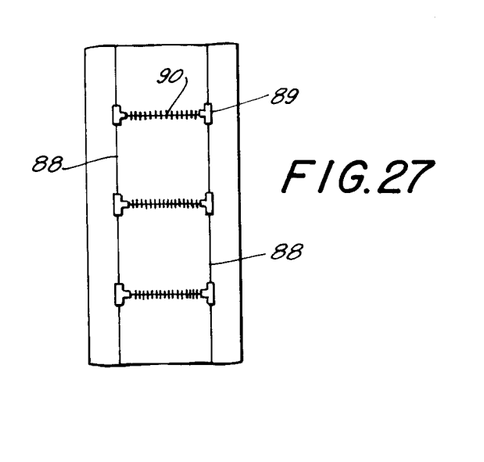

The embodiment of FIG. 27 employs a pair of circumferential anchor members 88 in parallel relationship and on the outer peripheral surface of the tire and appropriate fittings 89 for connection to a series of perpendicular spaced transverse members 90 located on the outer circumference of the tire.

Figure 28:
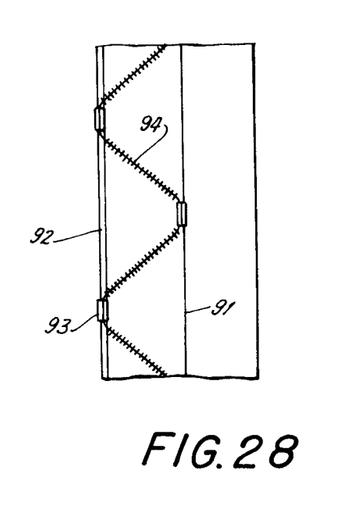

The embodiment of FIG. 28 is somewhat different in that it has one anchor member 91 located in the circumferential groove on the outer peripheral surface of the tire and the other anchor member 92 positioned on one side wall of the tire. Appropriate fittings 93 are employed to connect anchor members 91 and 92 to diagonally position transverse elements 94.

Figure 29:
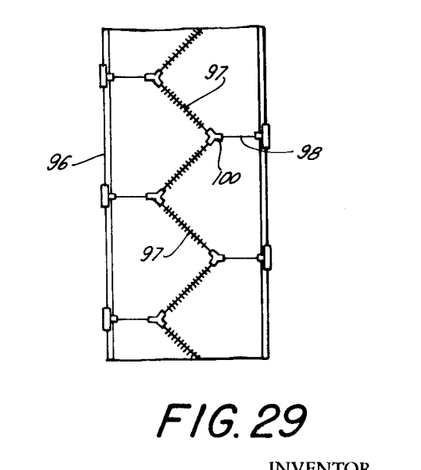

The final embodiment shown in the drawings is depicted schematically in FIG. 29. In this embodiment the anchor members 95 and 96 are located on opposing side walls of the tire and the transverse non-skid elements 97 are positioned in a zig zag and diagonal relationship on the outer peripheral surface on the tire. In order to facilitate the connection between the zig zag diagonal elements 97 and anchor members 95 and 96 short lengths of cable 98 are employed. The lengths of cable 98 are substantially perpendicular to the anchor members 95 and 96. T-shaped fittings 99 are employed to connect one end of each length of cable 98 to an anchor member and a Y-shaped fitting 100 is employed to connect the other end of each length of cable 98 to two adjacent transverse elements 97.

It should be readily apparent that the number of embodiments depicted above are merely representative of the variety of different non-skid assemblies which may be employed while still embodying this invention.

Thus, the above objectives of the invention, among others are effectively attained.

I claim:

1. A non-skid tire structure comprising
   a tire having a pair of opposed side walls and a peripheral road contacting outer circumferential surface;
   the outer surface of said tire having a plurality of transverse spaced grooves on the circumference thereof;
   a deformable non-skid assembly mounted on said tire;
   said assembly including at least one anchor member on the tire;
   said assembly including a plurality of transverse elements with each element having its ends connected to the at least one anchor member;
   a central portion of each of said elements normally positioned in each of said grooves respectively with a small part thereof extending above the outer surface of said tire so that when the tire structure is rotating in normal engagement with a road surface said elements will remain positioned in said grooves and when said tire structure skids on the road surface each element that contacts the road surface will frictionally engage therewith and said assembly will automatically deform to permit the element to be at least partially displaced from the groove to increase frictional engagement between the road surface and the tire structure and thereby assist in stopping the skid and returning the tire structure to normal engagement with the road surface at which time said assembly will automatically return to its normal configuration and position.

2. The invention in accordance with claim 1 wherein the assembly has two anchor members positioned on each of said side walls respectively and each of said anchor members normally has a substantially circular configuration and a fastening means is provided on at least one of said members facilitating mounting and dismounting of said assembly with respect to said tire.

3. The invention in accordance with claim 1 wherein each of said transverse elements includes a length of cable, a multiplicity of discs with each disc having a central opening therein and a notched outer surface thereon, said discs being mounted on the central portion of said cable with said cable passing through the hole in each of said discs, the opening in each of said discs being slightly larger than the outer diameter of the cable to thereby permit movement of said discs with respect to said cable, and a predetermined number of anti-skew members mounted on said cable with two of said anti-skew members positioned respectively at each end of said multiplicity of discs so as to retain said discs on the desired portion of said cable and the remaining anti-skew members being rotatably mounted on said cable and positioned in an interspaced relationship with respect to one another so that a number of said discs are located between each pair of successive anti-skew members, and the spacing between the two outermost anti-skew members is predetermined so that each disc is permitted slight lateral and pivotal movement with respect to each adjacent disc.

4. A deformable non-skid assembly adapted to be removably mounted on a tire having a pair of opposed side walls and a peripheral road contacting outer circumferential surface having a plurality of transverse spaced grooves on the circumference thereof to thereby form a non-skid tire structure comprising:
   said assembly including at least one of anchor members with each of said anchor members adapted to be positioned on the tire;
   said assembly including a plurality of transverse elements with each element having its ends connected to said at least one anchor member;
   a central portion of each of said elements adapted to be normally positioned in each of said grooves respectively with a small part thereof extending above the outer surface of the tire so that when the tire structure is rotating in normal engagement with a road surface the elements will remain in position in the grooves and when the tire structure skids on the road surface each element that contacts the road surface will frictionally engage therewith and the non-skid assembly will automatically deform to permit the element to be at least partially displaced from the groove to increase frictional engagement between the road surface and the tire structure and thereby assist in stopping the skid and returning the tire structure to normal engagement with the road surface at which time said assembly will automatically return to its normal configuration and position.

5. The invention in accordance with claim 4 wherein the assembly has two anchor members positioned on each of said side walls respectively and each of said anchor members normally has a substantially circular configuration and a fastening means is provided on at least one of said members facilitating mounting and dismounting of said assembly with respect to said tire.

6. The invention in accordance with claim 5 wherein each of said transverse elements includes a length of cable, a multiplicity of discs with each disc having a central opening therein and a notched outer surface thereon, said discs being mounted on the central portion of said cable with said cable passing through the hole in each of said discs, the opening in each of said disc being slightly larger than the outer diameter of the cable to thereby permit sliding movement of said discs with respect to said cable, and a predetermined number of anti-skew members mounted on said cable with two of said anti-skew members positioned respectively at each end of said multiplicity of discs so as to retain said discs on the desired portion of said cable and the remaining anti-skew members being rotatably mounted on said cable and positioned in an interspaced relationship with respect to one another so that a number of said discs are located between each pair of successive anti-skew members, and the spacing between the two outermost anti-skew members is predetermined so that each disc is permitted slight lateral and pivotal movement with respect to each adjacent disc.

7. An anti-skid assembly element adapted to be connected to a tire structure comprising:
   a length of cable adapted to be mounted at both ends to said tire structure, a multiplicity of discs with each disc having an opening therein, said discs being mounted on the central portion of said cable with said cable passing through the opening in each of said discs, the opening in each of said discs being slightly larger than the outer diameter of the cable to thereby permit movement of the discs with respect to said cable.

8. The invention in accordance with claim 7 wherein each of said discs has a notched radial outer surface portion.

9. A non-skid tire structure comprising:
   a tire having a pair of opposed side walls and a peripheral road contacting outer circumferential surface;
   the outer surface of said tire having a plurality of spaced grooves on the circumference thereof;
   a deformable non-skid assembly mounted on said tire;
   said assembly including at least one anchor member on the tire;
   said assembly including a plurality of non-skid elements with each element having its end connected to the at least one anchor member;
   a central portion of each of said elements normally positioned in a corresponding groove on the circumference of the tire so that when the tire structure is rotating in normal engagement with a road surface said elements will remain positioned in said groove and when said tire skids on the road surface each element will contact the road surface and will frictionally engage therewith and said assembly will automatically deform to permit the element to be at least partially displaced from the groove to increase frictional engagement between the road surface and the tire structure and thereby assist in stopping the skid and returning the tire structure to normal engagement with the road surface at which time said assembly will automatically return to its normal configuration and position.

10. A deformable non-skid assembly adapted to be removably mounted on a tire having a pair of opposed side walls and a peripheral road contacting outer circumferential surface having a plurality of spaced grooves on the circumference thereof to thereby form a non-skid tire structure comprising:
   said assembly including at least one anchor member with each of said anchor members adapted to be positioned on the tire;
   said assembly including a plurality of non-skid elements with each element having its ends connected to the at least one anchor member;
   a central portion of each of said elements adapted to be normally positioned in a corresponding groove on the circumference of the tire so that when the tire structure is rotating in normal engagement with a road surface said elements will remain positioned in said grooves and when said tire structure skids on the road surface each element will contact the road surface and will frictionally engage therewith and said assembly will automatically deform to permit the element to be at least partially displaced from the groove to increase frictional engagement between the road surface and the tire structure and thereby assist in stopping the skid and returning the tire structure to normal engagement with the road surface at which time said assembly will automatically return to its normal configuration and position.

* * * * *

PO-1050
(5/69)

UNITED STATES PATENT OFFICE
CERTIFICATE OF CORRECTION

Patent No. 3,683,990				Dated August 15, 1972

Inventor(s) John Detwiler

It is certified that error appears in the above-identified patent and that said Letters Patent are hereby corrected as shown below:

Column 5, line 62, after "separators" insert --.--.

Column 6, line 48, after "placement" insert --of--.

Column 7, line 11, change "reSistant" to --resistant--.

Column 7, line 12, after "material" insert --than--.

Column 7, line 31, change "sand" to --and--.

Column 8, line 18, after "shown" insert --in--.

Column 9, line 17, change "are" to --were--.

Column 13, line 51, change "member" to --members--.

Column 13, line 62, change "of" to --on--.

Column 14, line 16, change "on", 2nd occurrence to -- of -- .

Signed and sealed this 20th day of March 1973.

(SEAL)
Attest:

EDWARD M. FLETCHER, JR.			ROBERT GOTTSCHALK
Attesting Officer				Commissioner of Patents